United States Patent [19]
Klaiber et al.

[11] Patent Number: 5,905,855
[45] Date of Patent: May 18, 1999

[54] METHOD AND APPARATUS FOR CORRECTING ERRORS IN COMPUTER SYSTEMS

[75] Inventors: Alex Klaiber, Menlo Park; Robert Bedichek; David Keppel, both of Palo Alto, all of Calif.

[73] Assignee: Transmeta Corporation, Santa Clara, Calif.

[21] Appl. No.: 08/807,542

[22] Filed: Feb. 28, 1997

[51] Int. Cl.[6] .................................................. G06F 11/26
[52] U.S. Cl. ............................ 395/183.07; 395/183.13; 395/185.03; 395/568
[58] Field of Search .......................... 395/183.07, 183.13, 395/183.15, 185.02, 185.03, 182.09, 200.38, 200.39, 568, 569; 364/285.2

[56] References Cited

U.S. PATENT DOCUMENTS

| | | | |
|---|---|---|---|
| 4,590,549 | 5/1986 | Burrage et al. | 364/131 |
| 4,814,971 | 3/1989 | Thatte | 395/182.13 |
| 5,029,071 | 7/1991 | Kinoshita | 395/182.09 |
| 5,086,499 | 2/1992 | Mutone | 395/182.01 |
| 5,138,708 | 8/1992 | Vosbury | 395/182.09 |
| 5,430,866 | 7/1995 | Lawrence et al. | 395/182.18 |
| 5,434,998 | 7/1995 | Akai et al. | 395/182.09 |
| 5,590,277 | 12/1996 | Fuchs et al. | 395/183.14 |
| 5,729,554 | 3/1998 | Weir et al. | 395/183.07 |
| 5,737,531 | 4/1998 | Ehley | 395/200.38 |

*Primary Examiner*—Robert W. Beausoliel, Jr.
*Assistant Examiner*—Scott T. Baderman
*Attorney, Agent, or Firm*—Stephen L. King

[57] ABSTRACT

A computer implemented process for detecting errors in computer systems including the steps of executing sequences of instructions of a software program on each of a reference system and a test system, detecting and recording state of the reference system and the test system at comparable points in the execution of the program, and comparing the detected state of the reference system and the test system at selectable comparable points in the sequence of instructions including the end of the sequence of instructions. In a particular embodiment, the execution of portions of the sequence of instructions between selectable comparable points on each of the reference system and the test system is automatically replayed if a difference in compared state of the systems is detected.

23 Claims, 3 Drawing Sheets

METHOD AND APPARATUS FOR CORRECTING ERRORS IN COMPUTER SYSTEMS

BACKGROUND OF THE INVENTION

1. Field of the Invention

This invention relates to computer systems and, more particularly, to systems for rapidly and accurately debugging computer systems.

2. History of the Prior Art

It is often desirable to detect errors in a computer process or a computer system. To accomplish this, one typically tests the behavior of the system being designed (the "test system") against models of a system (the "reference system") which are known to function correctly. If the behaviors of the test and reference systems agree, the test system is presumed to be functioning correctly. If the behaviors of the systems differ, an error has been detected.

There are many ways to compare the behavior of two systems. One is to cause each system to generate a stream of internal or external events such as procedure calls, state transitions, or bus signals, and compare the two streams. However, some event streams may be too difficult to capture to make comparison of the event streams practical. Other event streams may be too expensive to capture. Yet other event streams may be too coarse-grained to provide useful localization of the errors. In some event streams, the events may depend too much on the implementations of the systems and thus be incomparable.

Another comparison technique is to run both systems, record the state of the systems while running, and then compare the state of the systems. State comparison may suffer the same kinds of problems as the comparison of events streams. Some state may be expensive or impossible to access or may depend too much on implementation details of the two systems.

Different methods may be used to accomplish comparison of either state or events. Traditionally, where the reference system is informal or is a non-executable, the method has been an ad hoc search for various test state or events that are inconsistent with state or events produced by the reference. This method, of course, offers significant chance to miss important problems which may reside in the test system.

Where the reference is an executable specification, it would be desirable to be able to simply run the two systems simultaneously and compare the state at any instant to detect differences. The problems delineated above make this more difficult.

The exact comparison of system state after each step is not generally possible. First, the test system and reference system necessarily differ in some manner (such as function, implementation, or performance) so that the total state of the systems is not comparable at all times. With some systems, the total state may never be comparable. For example, it is often desirable to compare the state of a test system which is significantly different that the reference system as when porting an application program from one type of processor running a first operating system to another type of processor running a second operating system.

What is necessary is that the test system produce the same final results as the reference system. Since the processors and operating systems differ, the operations being performed at any instant in running the two systems (and thus the state) will probably differ.

Second, it may be prohibitively expensive to repeatedly compare the state after each operation by each system. In order to compare the state of two systems, all of memory (possibly including second level storage) and all of the registers of the two systems must be compared to see if they are the same. The sheer size of the state comparison makes this expensive.

Finally, some state information may be unavailable, for example state in unreadable processor registers or state that is represented implicitly in one of the systems. Therefore, the comparison must often be selective.

Even though the comparison of state at all points during execution is difficult, it is possible to select points at which the results of the test and reference system should be the same. At these points, a comparison of state may be taken. However, to date no automated or rapid method for comparing systems has been devised.

It is desirable to provide a method and apparatus for rapidly detecting errors in a test system.

More particularly, it is desirable to provide a method and apparatus for detecting errors in a computer process or a computer system.

SUMMARY OF THE INVENTION

The present invention is realized by a computer implemented process for detecting errors in computer systems comprising the steps of executing sequences of instructions of a software program on each of a reference system and a test system, detecting and recording state of the reference system and the test system at comparable points in the execution of the program, comparing the detected state of the reference system and the test system at selectable comparable points in the sequence of instructions including the end of the sequence of instructions.

In a particular embodiment, the execution of portions of the sequence of instructions between selectable comparable points on each of the reference system and the test system is automatically replayed if a difference in compared state of the systems is detected.

These and other features of the invention will be better understood by reference to the detailed description which follows taken together with the drawings in which like elements are referred to by like designations throughout the several views.

DETAILED DESCRIPTION

Figure 1:
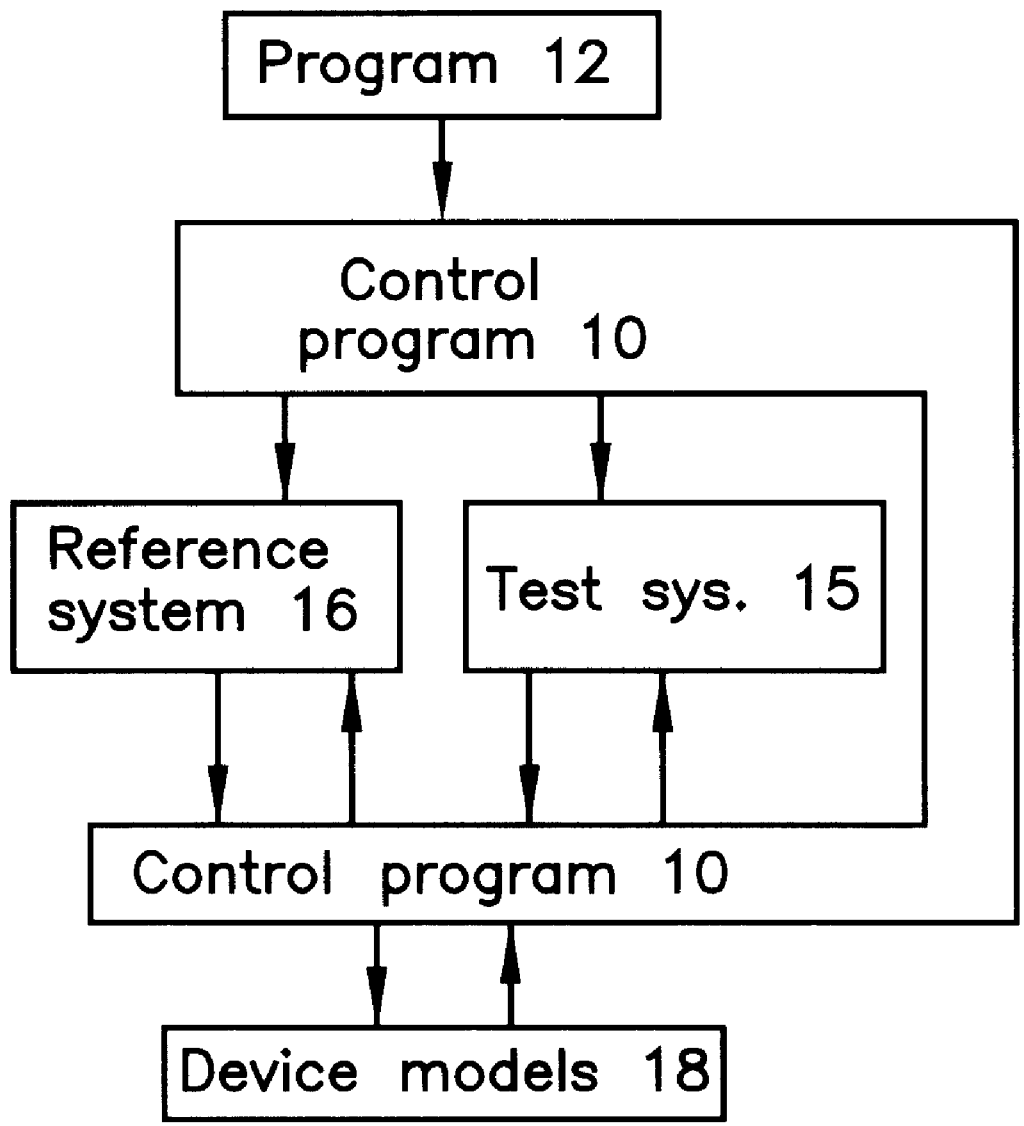
FIG. 1 is a block diagram of a system designed in accordance with the present invention.

Referring now to FIG. 1, there is illustrated a block diagram of apparatus constructed in accordance with the present invention. The present invention utilizes a control mechanism 10 which receives instructions from a program 12 it is desired to execute on a test system 15 and one or more reference systems 16 utilizing input/output devices or models 18. The program 12 may be a hardware or software program or process or any variation of those. The test and reference systems 15 and 16 may each be hardware, software, or some combination of each. The control mechanism 10 controls the execution of the program 12 by both the test system 15 and the reference system 16. The program 12, although shown as a separate entity in the figure, may be embedded in the systems or supplied from outside the systems. The program 12 may have different representations for each of the systems but must at some level compute the same results. The control mechanism 10 may be any control that provides a means to run the program 12 in increments and to read or verify the state of the two systems in increments.

In principle, it would be possible to execute the program 12 by executing the program in single steps and comparing the state of the systems at each step. However, checking a large amount of state at every step will often be prohibitively expensive. In addition, simple stepping may not be possible. For example, some results may be computed in one order by one system and in a different order on another. Instead, the present invention uses the control mechanism 10 to execute several or many steps in the test and reference systems. Thus, the control mechanism may execute a known and often large number of steps of the program 12 on the test system 15 and then repeat the execution of the steps on the reference system 16. Then, state comparison may be performed. By executing a number of steps before comparison, the cost of comparison is amortized over several steps, and the current invention is also able to find errors in systems that do not perform identical computations at each step.

The control mechanism 10 executes a comparison predicate (an expression that is to be evaluated) that evaluates to either true or false. The comparison predicate need not be embedded in the control 10 and may vary depending on the systems under test, on the kinds of errors being analyzed, and on tradeoffs between the performance and accuracy of error localization. In addition, the comparison predicate may change during execution. For example, if the reference system and the test system are both processors, the comparison predicate may frequently perform a quick check of the user-visible registers of both processors and may also periodically perform a more expensive but more comprehensive check of hidden registers and memory.

It should be noted that each of the test and reference systems may have state that is never used in comparison and which is therefore ignored in the comparison. Likewise, each system may represent some state in different ways, such that the comparison predicate or its surrogate must perform some state transformation in order to perform the comparison. The notion of "state" may be extended to include the state of an event log, in order to take advantage of event stream debugging. For example, the predicate may compare elements in a time stamped input/output log, in order to ensure that the external behavior of both systems is the same. Finally, the predicate may compute approximate information, for example a checksum and cyclical redundancy check (CRC) of a set of values rather than comparing all of the values explicitly.

The control program 10 controls execution based on a number of premises. First, it will be recognized that if the same program 12 is correctly executed by two systems, then the individual instructions executed by the two systems may be different but there are points where specific parts of the states of the two systems should be equivalent if the test system and the reference system are each functioning correctly to provide the same results. These points are referred to in this specification as "comparable points in virtual time" or simply "comparable points." For example, a reference system may be a simple processor (such as a RISC processor) combined with a simulator and which is used to emulate a complex processor (such as a CISC processor), while a test system may be such a complex processor. The reference system will typically execute several instructions to mimic the behavior of a single instruction in the test system. Consequently, the state of the reference system will only be comparable at times that correspond to whole instructions being executed in the test system.

The present invention is also based on the recognition that, at some level, the operations of correctly functioning computer systems are deterministic. Thus, when a sequence of instructions has commenced running on a processor, the results of those instructions are determined by the initial machine state except for events external to the sequence of instructions such as interrupts and input/output operations. Only these external operations can cause a variation in the manner in which the program executes on the system. To eliminate such variations in some embodiments, the behavior of a single set of device models is shared by the reference system and by the test system. This simplifies a variety of state comparison issues. An additional benefit is that debugging may be substantially faster with a single set of devices than with separate devices for both systems. The present invention takes external events from the device models 18 and shares them between the test and reference systems. The control mechanism 10 ensures that the external events are presented to the test and reference systems at the same comparable points in virtual time, so that external events will have the same effects. Consequently, the two systems 15 and 16 are theoretically executing programs producing identical results with identical external events. However, it should be recognized that a large number of comparable points may exist between any two comparable points at which external events occur.

The recognition that with correctly functioning computer systems once a sequence of instructions has commenced running on a processor the results of those instructions are determined except for events external to the sequence of instructions and the elimination of asynchronous external events, allows comparisons at comparable points in virtual time during execution of the program by the two systems. The control mechanism 10 periodically compares some portion of the state of the reference system and test system. When parts of the state of the systems vary (are incompatible according to the comparison predicate) at any comparable point, an error (called a divergence) has been encountered. The divergence may have occurred at any point since the last state comparison. Detecting a divergence utilizing comparable points at which sufficient state is reasonably available to detect system errors provides significant advances over prior art error detection systems.

The current invention can also automatically narrow the scope of the error by searching over virtual time since the last state comparison that indicated identical state. To accomplish this, the execution of the program is halted at the earliest comparable point at which a deviation of state is detected. As a result of being able to record and replay external events which may be shared during execution and replay, it is possible to "return to an earlier comparable point" and then execute forward again and get the same results. This allows "replaying" a portion of the program which has been executed and in which an error occurred. To support replaying, the control mechanism 10 periodically checkpoints or records the state of the test and reference systems at preselected comparable points during execution of the program by the systems. The operation of the systems may then be returned to an older checkpoint when a deviation is detected and the program 12 then executed forward to the desired comparable point.

A checkpoint need not capture all system state, but it should provide sufficient state to restart execution. Checkpointing more state tends to produce better debugging accuracy. Checkpointing may be performed with any period from never to every step; changing the checkpoint interval affects the performance of both forward execution and replay.

Replay also relies on a log of external events. When execution is restarted for a replay, the external events are taken from the log in order to ensure deterministic behavior on replay.

Many search techniques are possible; the best choice may vary depending on the relative speeds of forward execution and replay, state comparison, and the like. Moreover, when an error is detected, the control mechanism 10 may switch to using a more comprehensive or accurate state comparison predicate. In one embodiment, the control mechanism 10 may perform a binary search in virtual time as follows. The control mechanism 10 may set the beginning of the replay to a previous comparable point at which a successful state comparison occurred, probably the last comparison at a strictest level. The large number of comparable points which may exist between any two comparable points at which external events occur allows relatively fine grained isolation of errors after a deviation is detected. The control mechanism 10 may set the end of the replay to the comparable point at which the failed state comparison occurred and then execute the replay of the program to an intermediate comparable point half way between the beginning and end. The state of the systems is then compared again at this halfway point. If the state comparison fails at the halfway point, the end of the replay is set to the intermediate comparable point and searching continues with replay beginning at the same beginning point and continuing to a second intermediate comparable point half way between the beginning and new end point. The state of the systems is then compared again at the halfway point. If state comparison succeeds, the beginning is set to the intermediate comparable point and searching continues. In this manner, the search for an error is rapidly narrowed.

There are various circumstances that can terminate the search. For example, the control mechanism 10 may terminate the divergence search when the search range becomes so small that the range cannot be reduced further. At that point the divergence is considered "found." The smallest range depends on the test and reference systems and on the program being executed. The error may be reported to the user.

The manner in which the control mechanism 10 isolates the test and reference systems from asynchronous external events by presenting the same external events to each of the test and reference systems offers a number of advantages in addition to the ability to assure consistency and provide replay execution of the program 12. For example, over arbitrary segments of the execution of the program 12, the control mechanism 10 may selectively vary the rate and distribution of external events over arbitrary segments of the execution of the program 12. This allows the control mechanism to generate test situations such as unusually high arrival rates for external events.

The control mechanism 10 may also perform "perturbation analysis" by repeating a segment of execution which has provided a successful state comparison. Each time the execution is repeated, the initial state or delivery of external events may be altered but in such a matter that the final outcome of the execution should not change. If the final state does change from run to run, an error has been detected; and the error isolation techniques mentioned above can be used to narrow the location of the error in time by comparing against reference systems. For example, a critical section of the program 12 may be run several times; and each time the control mechanism 10 may deliver an interrupt at a different instruction in the sequence or change the initial content of caches in the test or reference system.

The invention is adapted to function with systems of different levels of complexity. For example, the test system may utilize register renaming or similar techniques to improve performance. Some data may be in a hardware or software cache in one system and in primary memory in the other, or represented implicitly in one system (requiring reconstruction of the data in question in order to effect state comparison). In order to compare state, the comparison predicate calls upon surrogates in the reference system and the test system in order to compare state by name rather than by location.

There are many embodiments of the present invention. In one embodiment, the reference system 16 is a straightforward decode-and-dispatch interpreter while the test system executes the same input programs using dynamic compilation of virtual machine code to native machine code. In order to maintain comparable points in virtual time, the reference system increments virtual time for each instruction fetched, while the test system increments virtual time using instrumentation code inserted in each dynamically-compiled block. The comparison predicate compares only state for the virtual machine that is being executed by each system.

Figure 2:
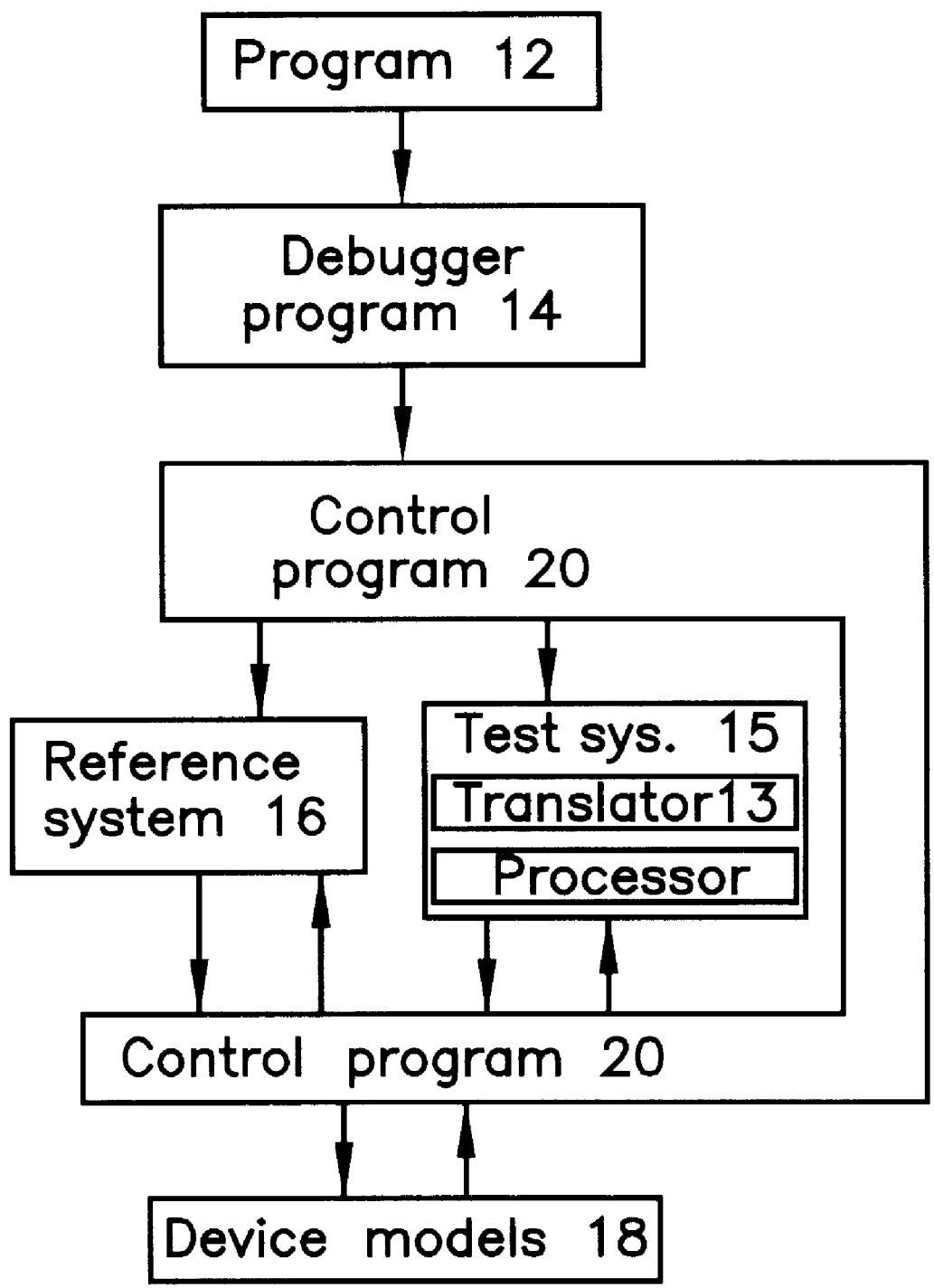
FIG. 2 is a block diagram of one embodiment of a system designed in accordance with the present invention.
Figure 3:
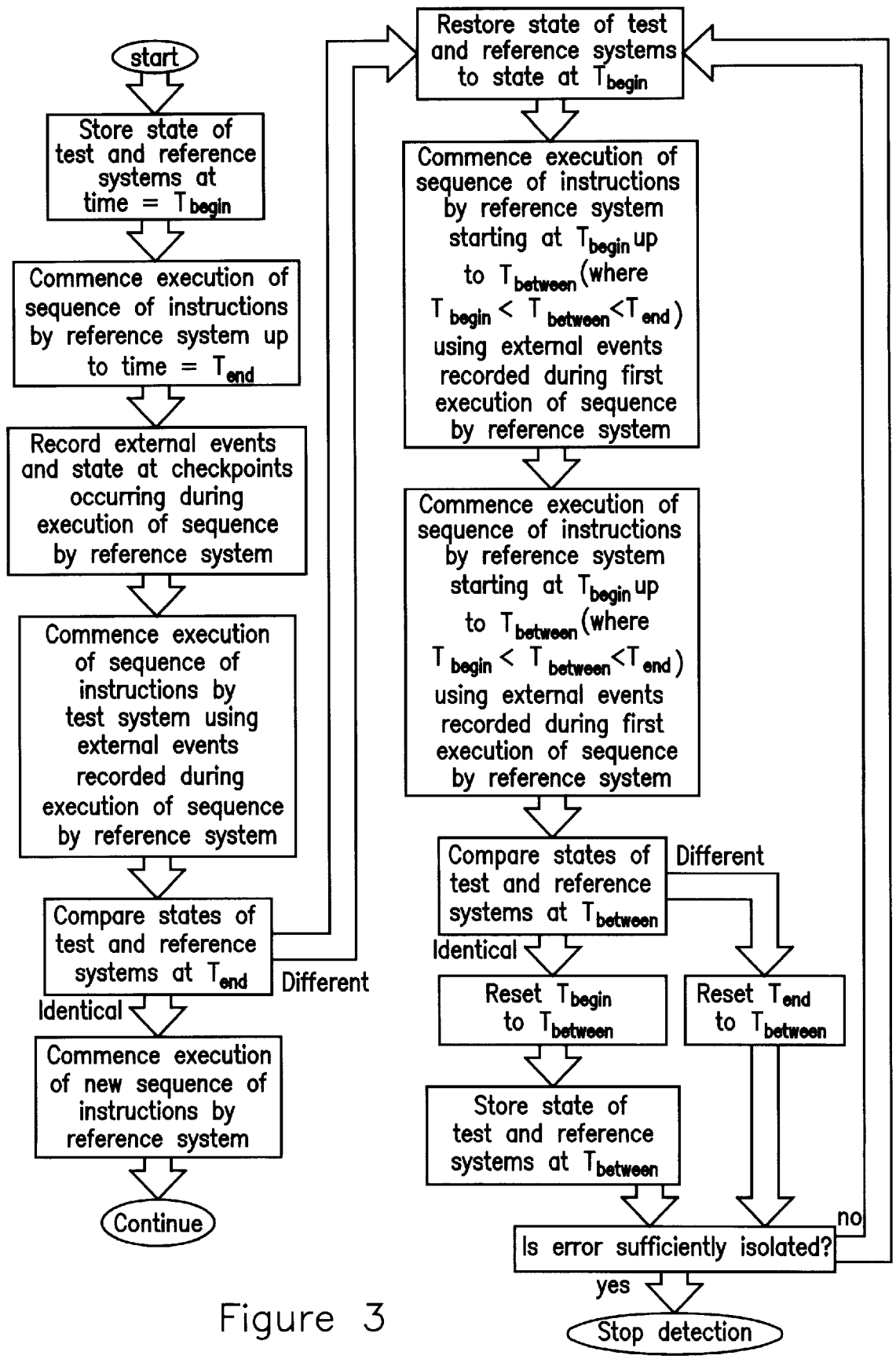
FIG. 3 is a diagram illustrating a process in accordance with the present invention.

One particularly useful embodiment of the present invention shown in FIG. 2 utilizes a software control program 20 which receives instructions from a program 12 it is desired to execute on the two different systems via a debugger program 14. The debugger program 14 may be selected as any useful program adapted to provide means by which the program 12 may be run in increments and the state of the system running the program tested at desired increments. The control program 20 controls the operations of both a reference system 16 and the test system 15 in executing the program 12.

In this embodiment of the invention, the test system 15 simulates a processor executing a translation program 13 which dynamically translates instructions of the program 12 into series of instructions which the processor is capable of executing to accomplish results of the instructions of the program 12. In executing the program 12 using the debugger 14, the control program 20 causes the system 16 to execute a known and often large number of the original instructions of the program 12 and then repeats the execution of these instructions using the system 15.

The control program 20 controls the entire execution by the two systems 15 and 16. In the FIG. 2 diagram illustrating apparatus for implementing the present invention, the debugger software 14 receives a sequence of instructions from the program 12 which is to known to run on a particular computer system such as a computer utilizing an Intel X86 microprocessor. A control program 20 designed in accordance with the present invention provides a typical computer system interface to the debugger software 14 and controls the application of the instructions to the test and reference systems 15 and 16. The control program 20 presents the same interface to the debugger software 14 as do the systems 15 and 16 to the control program 20. The control program 20 also interposes itself between the systems 15 and 16 and their devices 18 in order to provide logging and replay of external events.

There are many ways of maintaining comparable points of virtual time. In one embodiment, the program 12 is translated by a translation program 13 to instructions for an instruction set which executes on the test system 15. The test system 15 which includes a microprocessor combined with this translation program 13 is designed to execute programs of an instruction set originally designed to execute on a microprocessor defined by the reference system 16. In order to allow the determination of comparable points of virtual time at which the state of the original program 12 and the instructions translated by the translation program 13 are the same, the translation program 13 maps the points in the translation which coincide with the end of each instruction of the program 12 and which thus indicate the comparable points which may be used in comparing the two simulation models 15 and 16. The control program 20 looks for these comparable points in determining when and where to start and stop executing the sequences of instructions on the systems 15 and 16.

In addition to using this time domain mapping, the control program 20 provides means for detecting the mapping of the address space of the two simulation models 15 and 16 at the comparable points in the execution of the program 12 by the two systems 15 and 16. For example, one or the other of the systems may utilize register renaming or similar techniques to accelerate processing. In order to test the consistency of state using the two systems 15 and 16, the registers actually holding data which should be the same must be determined. Similarly, memory data may be stored in a processor cache in one system and not yet stored in memory, while in the other system, the same data may have been stored in main memory. Again, the correct memory must be compared to obtain useful results. In one embodiment, the control program 20 interrogates the systems under its control in terms of abstract register or memory names. Surrogates in the test and reference systems use private mappings from abstract names to storage locations to provide the desired data.

Once provided with these two mappings, a selected sequence of instructions from the program 12 are furnished by the debugger software 14 to the control program 20 for execution. The debugger software 14 typically provides the ability to execute a program in sequences determined by a user and to determine state of the executing model at selected times but has no ability to accomplish comparisons between the execution of a program on one system or another. The debugger software 14 furnishes the sequence of instructions to the control program 20. The control program 20 furnishes the sequence of instructions to the reference system 16 which runs the sequence of instructions. The control program 20 records the state of the system 16 at the beginning of the sequence before commencing the execution of the sequence on the system 16. As the sequence of instructions is executed on the system, the control program 20 records and time stamps each external event. Thus, the control program 20 records each input/output operation including the commands, addresses, and data transferred to any simulated input/output devices 18 and the responses returned to the system 16 from the simulated devices 18. The control program 20 also records each exception to which the system 16 responds during the sequence.

Next, the control program 20 executes the same sequence of instructions on the test system 15 to the ending comparable point of the sequence. In the execution of the sequence of instructions, the external operations (input/output or exception) which have been recorded for the reference system 16 are utilized from the log of results obtained from execution of the sequence by the system 16. Thus, if the system 16 caused an input/output operation to occur, the externally generated return from that operation is furnished to the system 15. In this manner, the return values are identical to those furnished to the reference system 16 so that the result within the test system 15 should be the same as the result within the system 16. Similarly, if the system 16 received an interrupt, the interrupt is recorded by the control program 20 and is later furnished to the test system 15 so that its response should be the same as the response of the reference system 16 if the test system 15 is correct. Using the external events logged in executing the program 12 by the system 16 eliminates the work of simulating devices which will function correctly with the second model, assures that the external events affecting the simulations are identical, and thus eliminates the chance that the program execution will vary because of asynchronous external events.

The sequence is completed in this manner on the system 15. Then, the state of the two systems is compared. If the state of the two systems is the same at the end of the sequence, a second sequence of instruction from the program 12 is furnished to the debugger 14 for execution on the two systems 15 and 16.

If the execution of any sequence of instructions from the program 12 produces different state in the test and reference systems at the comparable, then the program 12 is replayed from a previous checkpointed comparable point in the execution at which the comparison produced identical state. In the specific embodiment described herein, the process is rerun in a binary search mode in the manner explained above. In replaying the execution of a preceding sequence of instructions, it is useful to utilize the log of external events previously recorded during execution by the reference system to eliminate any variations in external events for execution on both systems. If a first half of the sequence produces the same state at a middle comparable point, a first half of the second half of the sequence of instructions is replayed for the test and reference systems. This binary testing of portions of the sequence continues so that the point of divergence of the two simulations is quickly isolated.

As will be seen, this binary testing for errors in the execution of a sequence of instructions provides very rapid isolation of the point of error. It is not necessary that a search to isolate errors be a binary search. For example, if executing the program is less expensive in time than is reversing the program to find a most recent comparable point at which state was consistent, it may be faster to replay smaller portions of the program and thereby reduce the number of times required to reverse the program in order to isolate errors. In any case, the ability to run the two models essentially in parallel through a long sequence of instructions which may vary in length under control of the operator or the control program allows very rapid and accurate debugging of the slave simulation model without the tedious step by step process required by the prior art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A system for correcting errors in a computer system comprising;

a test system in which errors are to be corrected;

a reference system different than the test system; and a control mechanism for executing a program on the reference system and the test system, the control mechanism including:

means for providing sequences of instructions for each of the test system and the reference system which represent the same sequences of instructions of the program, means for executing the sequences of instructions representing the same sequences of instructions of the program on the reference system and the test system, means for detecting and recording state of the reference system and the test system at comparable points in the execution of the program, and means for comparing the detected state of the reference system and the test system at selectable comparable points in the sequence of instructions including the end of the sequence of instructions.

2. A system as claimed in claim 1 which further comprises means for replaying the execution of portions between selectable comparable points of the sequence of instructions on each of the reference system and the test system if a difference in compared state of the systems is detected.

3. A system as claimed in claim 2 in which the means for replaying the execution of portions between selectable comparable points of the sequence of instructions on each of the reference system and the test system if a difference in compared state of the systems is detected responds to detection of a difference in compared state to reset a portion of the sequence of instruction to be replayed.

4. A system as claimed in claim 3 in which the means for replaying the execution of portions between selectable comparable points of the sequence of instructions on each of the reference system and the test system if a difference in compared state of the systems is detected conducts a search between a last comparable point at which state correctly compared in the test and reference systems and the comparable point at which the difference in compared state was detected.

5. A system as claimed in claim 4 in which the search conducted is a binary search.

6. A system as claimed in claim 1:
in which the control mechanism further comprises means for providing external events to the reference system, which further comprises means for recording external events provided by the means for providing external events to the reference system; and
in which the control mechanism comprises means for utilizing recorded external events of the reference system as external events for the test system in executing sequences of instructions.

7. A system as claimed in claim 6 in which the control mechanism comprises means for varying the external events and the comparable points at which external events are provided.

8. A system as claimed in claim 2:
in which the control mechanism further comprises means for providing external events to the reference system, which further comprises means for recording external events provided by the means for providing external events to the reference system; and
in which the control mechanism comprises means for utilizing recorded external events of the reference system as external events for the reference and the test system in replaying the execution of sequences of instructions.

9. A system as claimed in claim 1 in which the means for detecting and recording state of the reference system and the test system at comparable points in the execution of the program detects and records surrogate values representing state in the reference system and the test system.

10. A system as claimed in claim 6 in which the control mechanism comprises means for replaying the execution of portions between selectable comparable points of the sequence of instructions on each of the reference system and the test system while varying the application of external events.

11. A system as claimed in claim 1 in which the means for comparing the detected state of the reference system and the test system at selectable comparable points in the sequence of instructions including the end of the sequence of instructions is capable of selecting different state.

12. A computer implemented process for detecting errors in computer systems comprising the steps of:
providing for each of a reference system and a test system which differ sequences of instructions which if executed correctly effect the same result on each of the two systems,
executing the sequences of instructions on each of the reference system and the test system which differs from the reference system,
detecting and recording state of the reference system and the test system at comparable points in the execution of the program, and
comparing the detected state of the reference system and the test system at selectable comparable points in the sequence of instructions including the end of the sequence of instructions.

13. A computer implemented process as claimed in claim 12 further comprising the step of replaying the execution of portions of the sequence of instructions between selectable comparable points on each of the reference system and the test system if a difference in compared state of the systems is detected.

14. A computer implemented process as claimed in claim 13 in which the step of replaying the execution of portions between selectable comparable points of the sequence of instructions on each of the reference system and the test system if a difference in compared state of the systems is detected is accomplished in response to detection of a difference in compared state.

15. A computer implemented process as claimed in claim 13 in which the step of replaying the execution of portions between selectable comparable points of the sequence of instructions on each of the reference system and the test system if a difference in compared state of the systems is detected includes conducting a search between a last comparable point at which state correctly compared in the test and reference systems and the comparable point at which the difference in compared state was detected.

16. A computer implemented process as claimed in claim 13 in which the step of replaying the execution of portions between selectable comparable points of the sequence of instructions on each of the reference system and the test system if a difference in compared state of the systems is detected includes conducting a binary search between a last comparable point at which state correctly compared in the test and reference systems and the comparable point at which the difference in compared state was detected.

17. A computer implemented process as claimed in claim 13 in which the step of replaying the execution of portions between selectable comparable points of the sequence of instructions on each of the reference system and the test system if a difference in compared state of the systems is detected includes conducting a binary search between a last comparable point at which state correctly compared in the test and reference systems and the comparable point at which the difference in compared state was detected, the search technique being selected to enhance searching speed.

18. A computer implemented process as claimed in claim 12 in which the step of detecting and recording state of the reference system and the test system at comparable points in the execution of the program includes detecting and recording surrogate values representing state in the reference system and the test system.

19. A computer implemented process as claimed in claim 12 including the further steps of:

provide external events to the reference system, recording external events provided by the means for providing external events to the reference system; and utilizing recorded external events of the reference system as external events for the test system in executing sequences of instructions.

20. A computer implemented process as claimed in claim 19 which comprises the further step of varying the external events and the comparable points at which external events are provided.

21. A computer implemented process as claimed in claim 13 which comprises the further steps of:

providing external events to the reference system, recording external events provided to the reference system; and utilizing recorded external events of the reference system as external events for the reference and the test system in replaying the execution of sequences of instructions.

22. A computer implemented process as claimed in claim 21 in which the step of replaying the execution of the sequence of portions between selectable comparable points of the sequence of instructions on each of the reference system and the test system includes varying the application of external events.

23. A computer implemented process as claimed in claim 12 in which the step of comparing the detected state of the reference system and the test system at selectable comparable points in the sequence of instructions including the end of the sequence of instructions includes selecting the state to compare.

* * * * *